Nov. 21, 1950  R. THOMAS  2,530,793
SHUTTER AND LENS SYSTEM FOR
HIGH-SPEED COLOR CAMERAS

Filed May 10, 1946  7 Sheets-Sheet 1

INVENTOR.
RICHARD THOMAS,
BY
ATTORNEY.

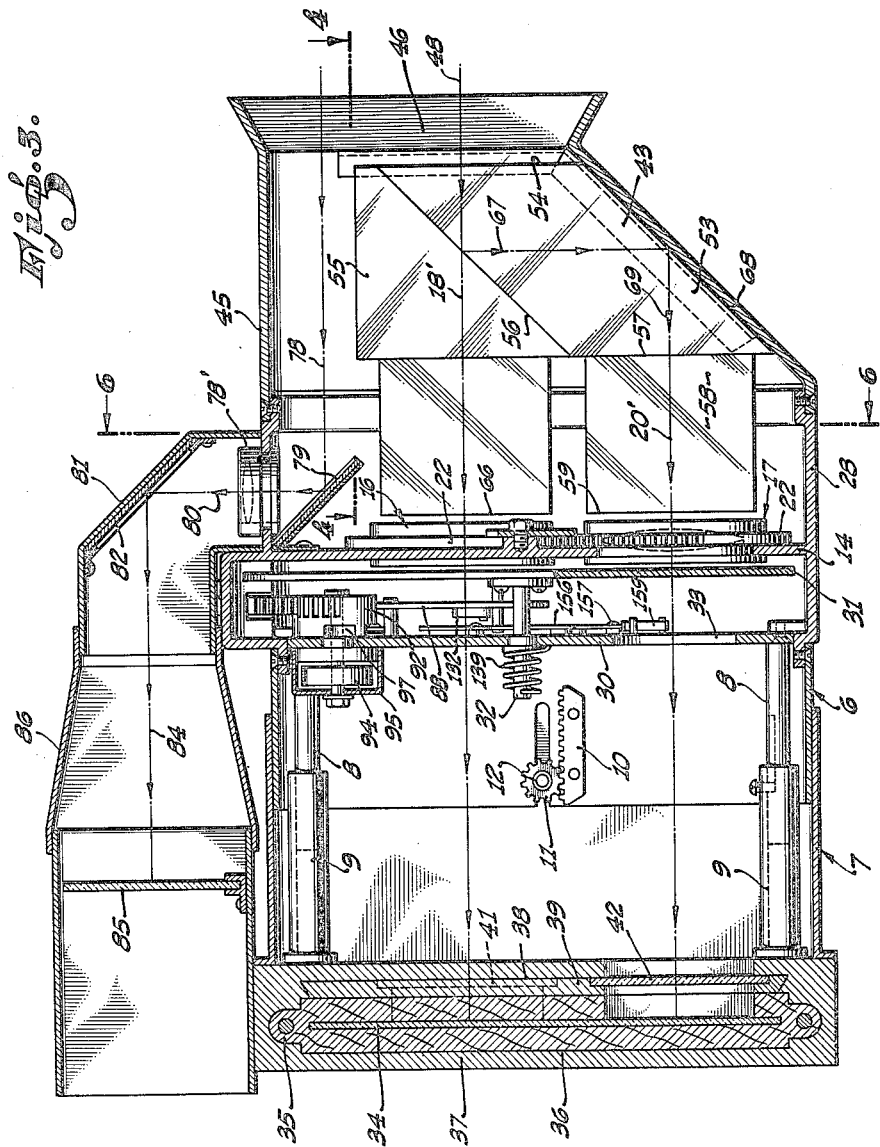

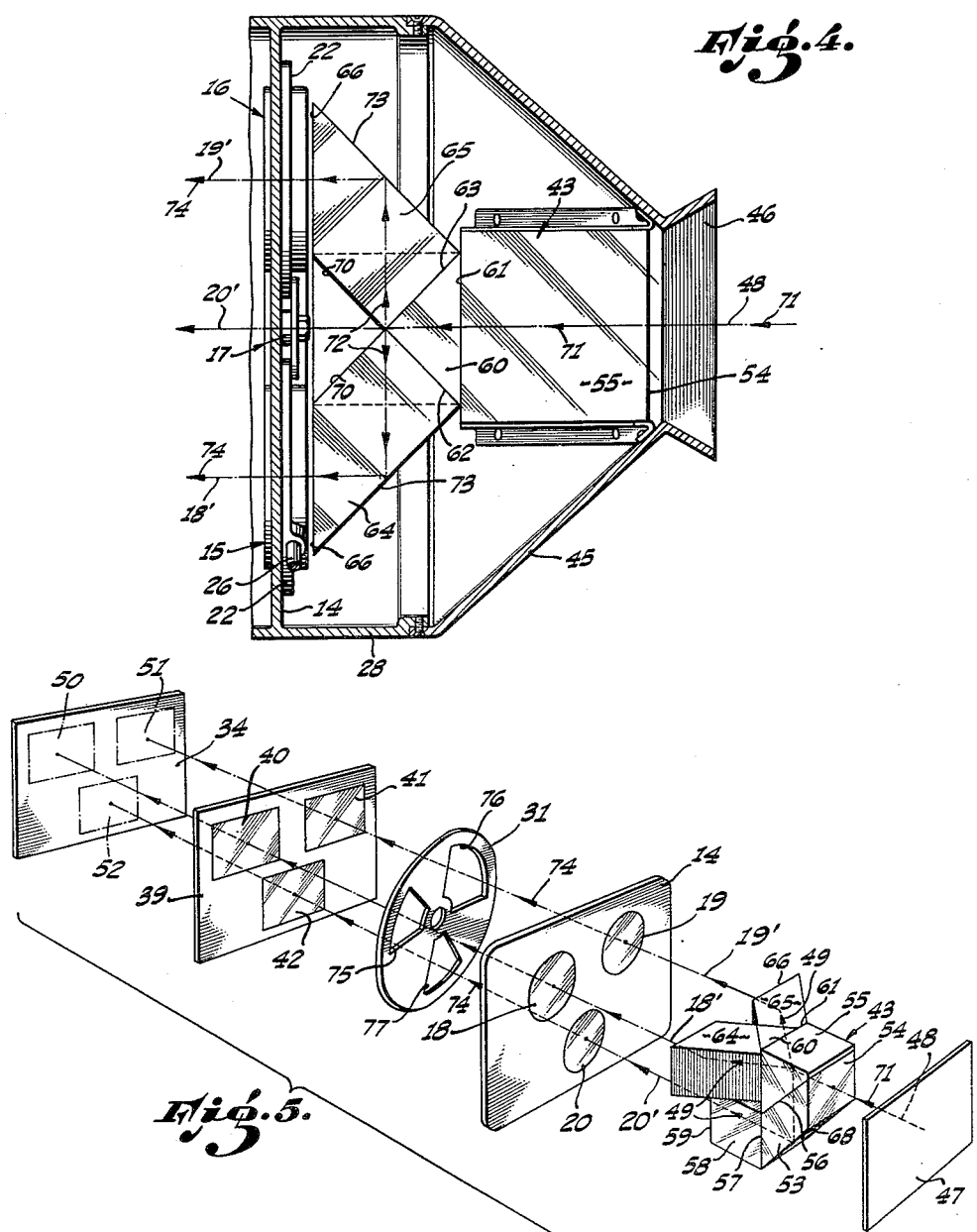

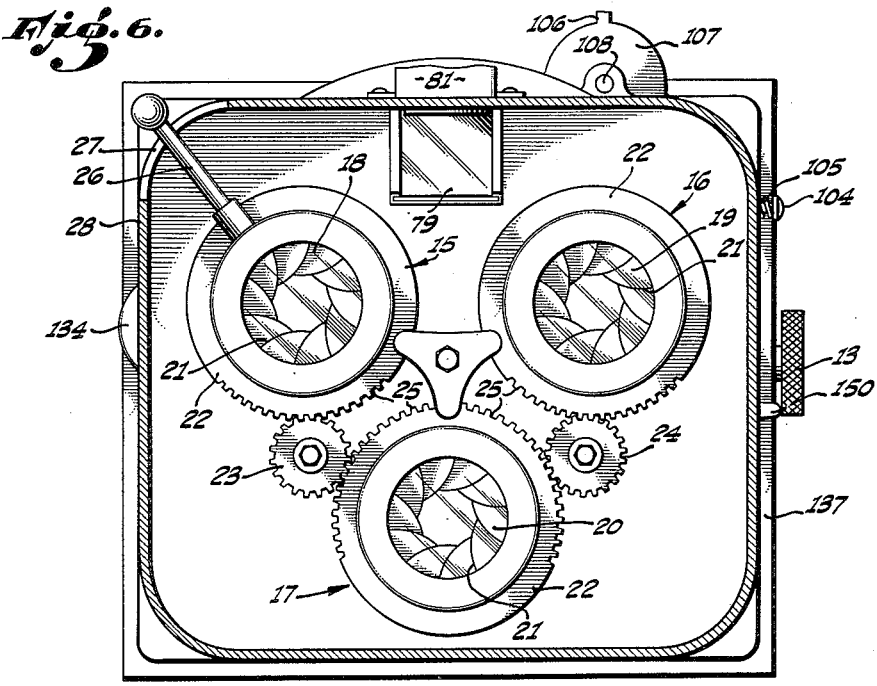
Fig. 6.
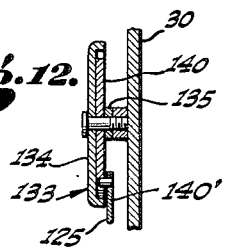
Fig. 11.
Fig. 12.
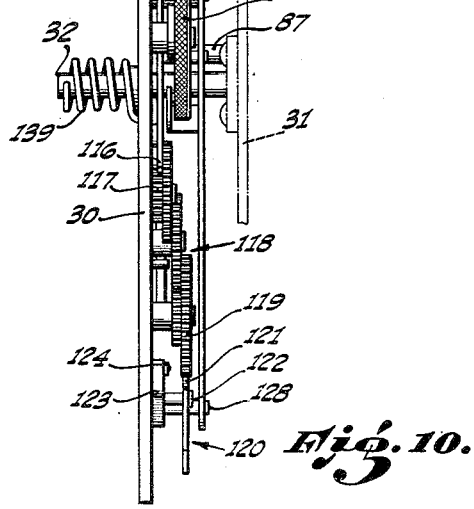
Fig. 10.
INVENTOR.
RICHARD THOMAS,
BY
ATTORNEY.

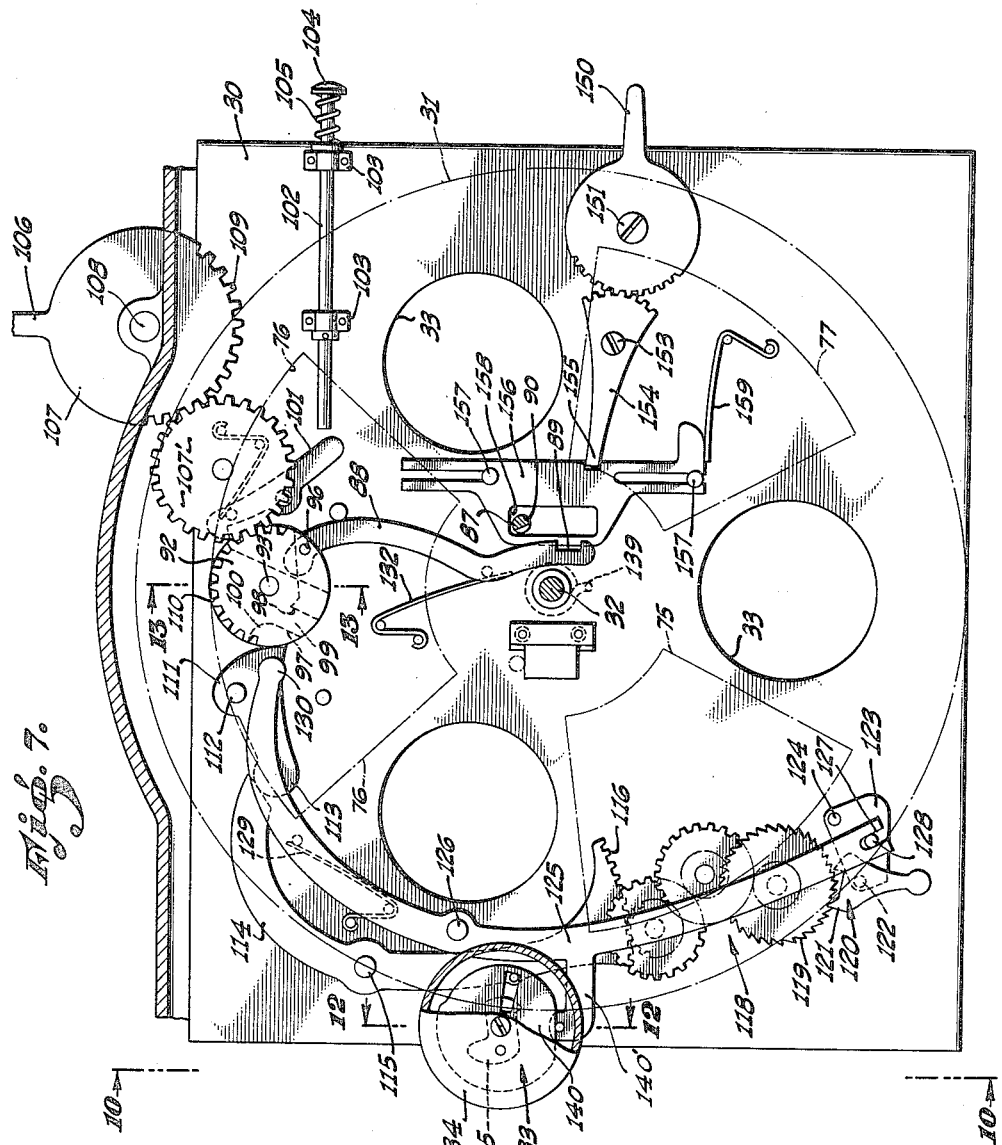

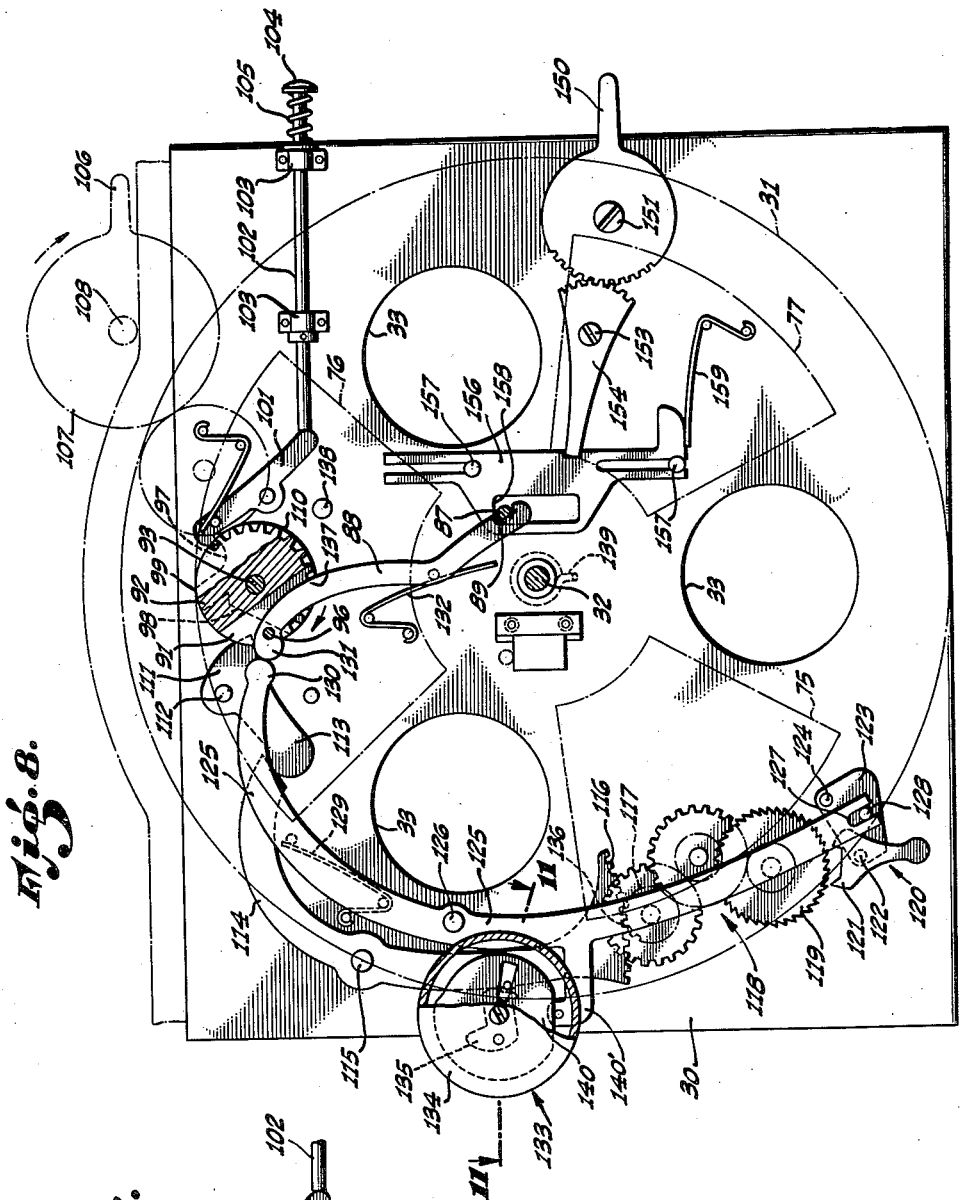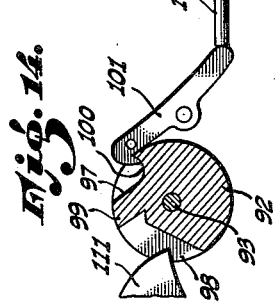

Nov. 21, 1950
R. THOMAS
2,530,793
SHUTTER AND LENS SYSTEM FOR HIGH-SPEED COLOR CAMERAS
Filed May 10, 1946
7 Sheets-Sheet 7
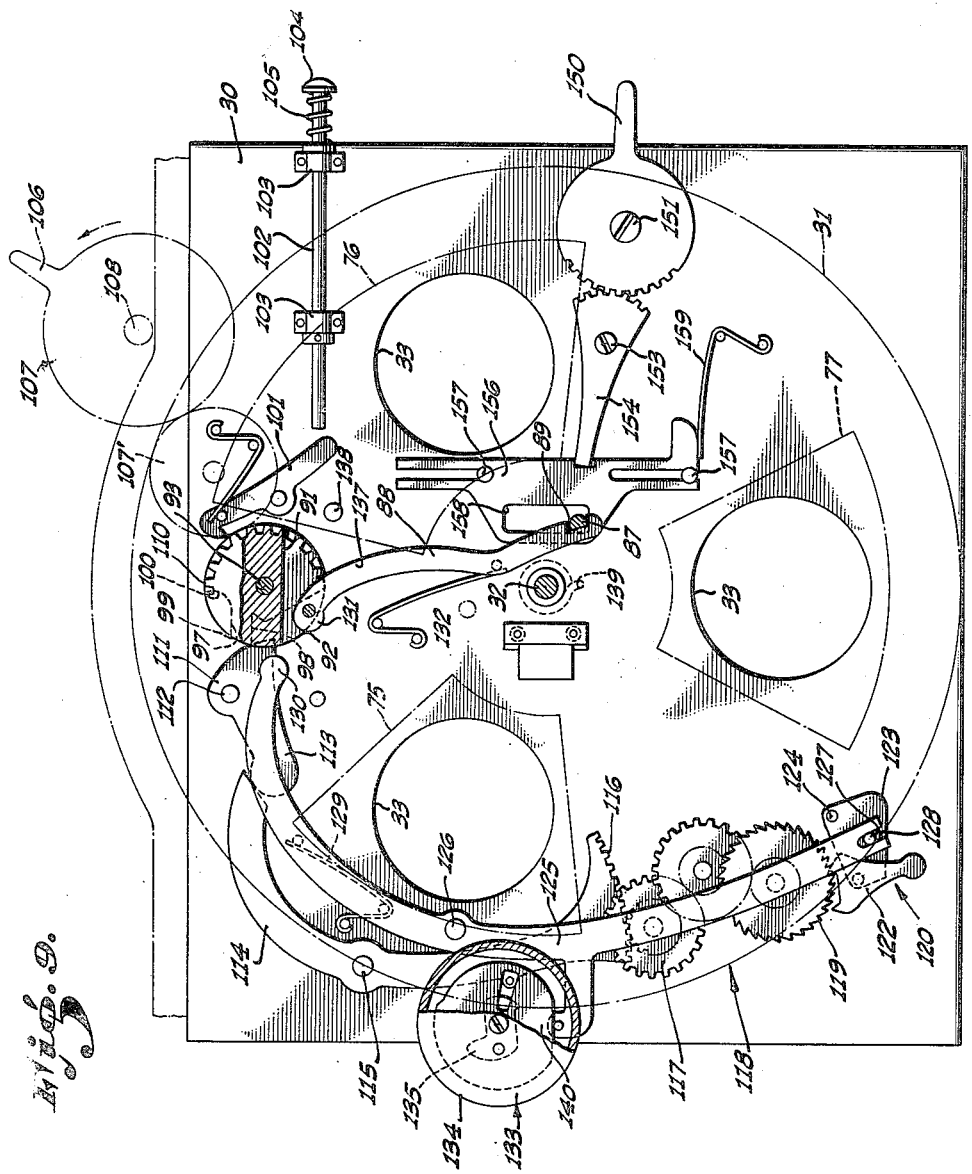
INVENTOR.
RICHARD THOMAS,
BY
ATTORNEY.

Patented Nov. 21, 1950

2,530,793

UNITED STATES PATENT OFFICE 2,530,793

SHUTTER AND LENS SYSTEM FOR HIGH-SPEED COLOR CAMERAS

Richard Thomas, Westwood Village, Calif.

Application May 10, 1946, Serial No. 668,731

1 Claim. (Cl. 95—12.2)

My invention relates to color photography and relates in particular to a camera for consistently photographing a complement of balanced color value images.

Although the invention is an important advance in cameras for color press photography where photographing of colored objects moving at high speed is desired, and for sound and wire colorphoto transmission, the invention is of special value as a means for expeditiously obtaining color value negatives for use in the color printing arts wherein color printing plates are made from color value or color separation negatives or positives, by which to print the colored inks in superimposed relation upon sheets of paper or other material of suitable character. In its present highly developed state, the color printing art is able to produce exceptionally fine reproductions of colored pictures or printed colored pictures of objects, scenes, etc., but very often the cost of producing the color printing plates is excessive due to the amount of reworking of the color printing plates required in order to balance or correlate the colors of which the picture is composed. The color printing plates are obtained photographically from color value or color separation transparencies, which are either positive or negative, depending upon the color printing process employed. If these transparencies are not balanced as to density of color thereby represented, the conditions of unbalance of the transparencies must be corrected in the preparation of the printing plates. In one practice of the art of preparing color printing plates, the engraver may set up the colored object, such for example, as a colored picture which is to be reproduced, and carefully focus his camera thereon. He will then separately photograph a plurality of photographically sensitized plates, using a color screen in front of the camera lens for each plate exposed, so as to obtain color separation transparencies. The densities of these transparencies will be balanced only if all of the conditions under which they are photographed or exposed are balanced. For example, a slight variation in shutter action or a slight variation in light intensity may occur, the result being that one or more of the color value transparencies will be out of balance with relation to the remaining transparencies. These inequalities or conditions of unbalance will be carried on through the process and corrections must be made in the printing plate to compensate therefor. As hereinbefore indicated, these corrections may require expenditure of a large amount of time which adds to the cost of preparing the complement of color printing plates an excess which is avoided or minimized where the present invention is employed.

It is an object of the present invention to provide for use in any of the branches of the photographic art means whereby each of the color value images is photographed with the same amount of light which passes from the colored object to the camera along a single axis, thereby avoiding parallax and obtaining balanced color value transparencies. It is an object of the invention, therefore, to provide a means whereby the photographic plate areas are exposed at the same time on a single photographic plate or film with the same intensity of light, which light passes through identical light admission apertures of the diaphragms associated with the balanced photographic lenses for the same length of time and through filters matched for spectral cut-off and intensity. Since the color value transparencies are produced under identical conditions such as set forth in the foregoing so that balanced transparencies are produced at the start of the process which leads finally to the preparation of the complement of color value printing plates, it is possible to carry these balanced relations through the process to the printing plates, thereby avoiding or minimizing reworking of the printing plate and consequently obtaining superior results in the final product of the process, namely, the colored pictures or prints, in comparatively short time and at low cost as compared to the previous practices of the art.

It is well known that very few shutter operating mechanisms are consistent in their action. That is to say, in consecutive operations of the shutter mechanism, with the same speed setting, there will be differences in exposure resulting from differences in the time that the shutter is open. Under these circumstances, it cannot be expected that where color value images are consecutively exposed, balanced color value images can be obtained. To assure balance in the color value images, it is an object of my present invention to provide a color camera having a single shutter mechanism which will produce identical times of exposure of the separate image receiving areas to light received from the object being photographed.

A further object of the invention is provided a color camera having means for establishing and maintaining a prescribed relationship between the light intensities which pass through the separate lenses of the camera to the photographic plate.

It is an object of the invention to provide a color camera having a plurality of lenses and variable aperture diaphragm means associated with these lenses, with means for correlating the adjustment of the diaphragm means so that a predetermined relationship will be preserved at all times between the areas of the apertures. When this feature of the invention is employed in conjunction with the correlated shutter action of the invention, predetermined relationships between the exposures of the separate photographic plate areas are preserved and coordinated or correlated color value images are consistently obtained, with the end result that where these images are employed in the formation of color printing plates, or otherwise composing a colored picture from the color value images, proper balance of the color values will be obtained.

It is an object of the invention to provide a camera for color photography having a plurality of lenses with associated adjustable diaphragms, and diaphragm adjusting means interconnected so that all of the diaphragms will be adjusted simultaneously, thereby contributing to the effect of obtaining balanced color value images.

A further object of the invention is to provide a camera in which photographic lenses of different focal length may be employed, this camera being characterized by maintenance of balanced color value images regardless of the focal lengths of the lenses, which are employed in sets to meet the conditions encountered by the photographer.

It is a further object of the invention to provide a camera having an improved finder and focusing device whereby the camera may be accurately directed at and focused upon the object, this device reproducing in an area separate from the plate area of the camera an image identical with the image formed in the focal plane or plate plane of the camera. A feature of the device is that the adjustment employed to bring the image in the finder to a sharp focus likewise brings the plate of the camera into a position of sharp focus with relation to the camera lenses for a given object distance.

A valuable feature of the invention is that the image formed in the finder is of the same size as the image formed on the photographic plate within the camera, the result being that in the use of the applicant's camera the photographer has all of the advantages obtainable in the still camera practice of first focusing the image on a ground glass, and then substituting the photographic plate for the ground glass. The important advantage in this respect obtained by the applicant's invention is that the plate is placed in the camera and the focusing of the camera is conducted while referring to the finder image, thus making it possible to immediately perform the photographic operation when the image is brought into sharp focus in the finder, without the delay which would be caused by the replacement in the camera of the ground glass focusing plate by the sensitized photographic plate.

Further objects and advantages of the invention will be brought out in the following part of the specification.

Referring to the drawings which are for illustrative purposes only,

Fig. 3 is a cross section taken substantially as indicated by the line 3—3 of Fig. 1.

Fig. 4 is a fragmentary sectional view taken as indicated by the line 4—4 of Fig. 3 to show the top of the prismatic light dividing member.

Fig. 5 is a schematic perspective view showing the light transmitting and receiving elements of the invention.

Fig. 6 is a sectional view taken as indicated by the line 6—6 of Fig. 3 to show the arrangement of the lenses on the lens supporting plate.

Fig. 7 is an enlarged face view of the shutter supporting plate and the shutter operating mechanism thereon in released position.

Fig. 8 is a view similar to Fig. 7, but showing the shutter operating mechanism set for operation of the shutter.

Fig. 9 is a view similar to Fig. 8 showing the shutter operating mechanism in position thereof wherein the shutter is open.

Fig. 10 is a side view of the shutter operating mechanism taken from the position indicated by the line 10—10 of Fig. 7.

Fig. 11 is a fragmentary sectional view taken as indicated by the line 11—11 of Fig. 8.

Fig. 12 is a fragmentary sectional view taken as indicated by the line 12—12 of Fig. 7.

Fig. 13 is a fragmentary sectional view taken as indicated by the line 13—13 of Fig. 7.

Fig. 14 is a fragmentary face view of the shutter operating element.

Figure 1:
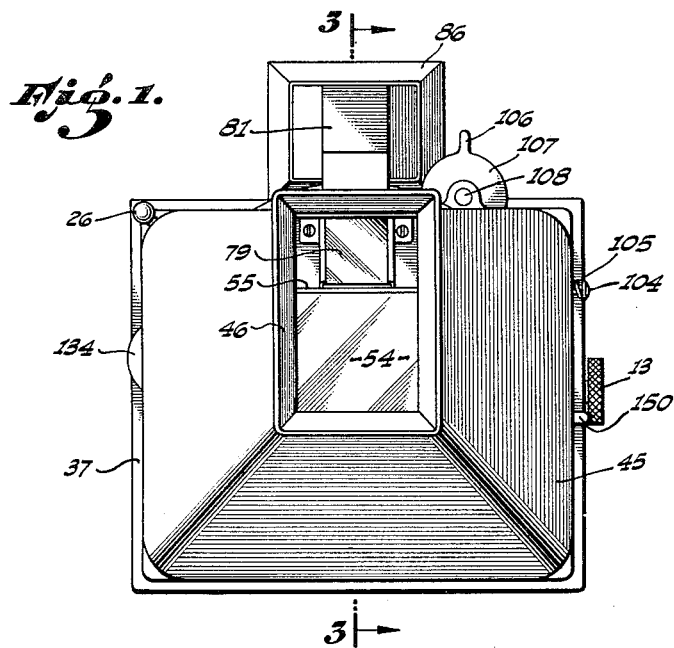
Fig. 1 is a front view of a camera embodying my invention.
Figure 2:
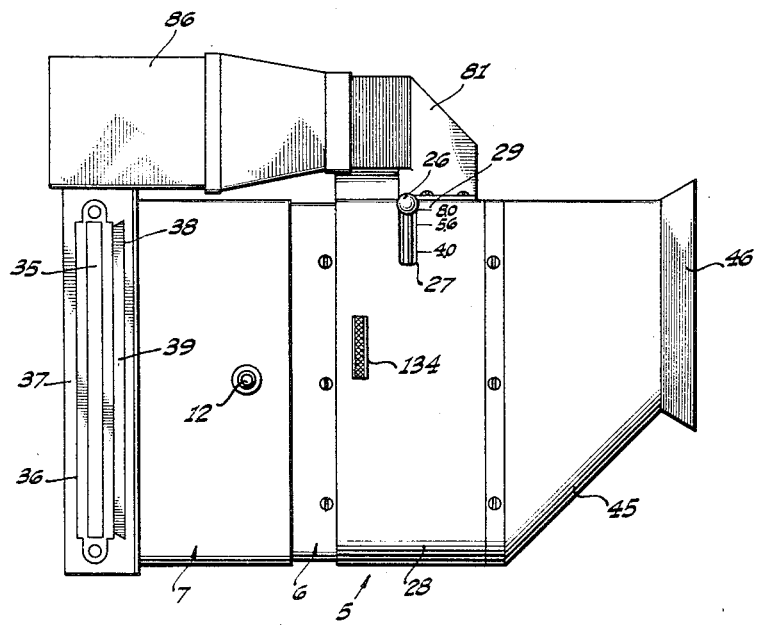
Fig. 2 is a side view of the camera from a position at the left thereof.

The preferred embodiment of the invention as shown in Figs. 1, 2, and 3 has a casing or shell 5 consisting of a front part 6 and a rear part 7, the front part 6 being telescoped into the rear part 7 for purpose of focusing the camera by moving the lenses carried by the front part 6 with relation to the photographic plate carried by the rear part 7. The front and rear parts 6 and 7 are guided in their relative movement by pins 8, Fig. 3, which extend rearwardly from the rear part 7 into guide sleeves 9 which project forwardly from the rear wall of the rear part 7. For the purpose of producing relative movement of the front and rear parts 6 and 7, racks 10 are supported on the side walls of the front part 6 for engagement by gears 11, mounted on a transverse shaft 12 which is supported by the side walls of the rear portion 7 and has on its outer end an adjusting knob 13, whereby the shaft 12 may be rotated so as to simultaneously rotate the gears 11.

The front part 6 of the casing 5 has a front wall 14 supporting lens units 15, 16, and 17 in the arrangement shown in Fig. 7. Each of these units respectively includes camera lenses 18, 19 and 20 which are all exactly the same, and adjustable aperture forming diaphragms 21 with diaphragm operating means, the details of which are not shown for the reason that various forms thereof are old in the photographic arts. The diaphragm adjusting means include rings 22 which are disposed in external relation to the lens units 15, 16 and 17 which, by rotation, accomplish adjustment of the diaphragms 21. It is a feature of the invention to provide means for simultaneously and equally adjusting the diaphragms 21, this correlating means consisting of small gears 23 and 24 placed respectively between the rings 22 of the lens units as shown and meshed with partial gears 25 which are cut in peripheral portions of the rings 22. Adjustment of all of the diaphragms 21 is accomplished by imparting rotation to one of the rings 22, the gears 23 and 24 carrying this rotative adjusting movement of one ring 22 to the remaining rings 22. An adjusting lever 26 is extended from the ring 22 of the lens unit 15 through a guarded slot 27 in the hood supporting wall 28 which projects forwardly from the periphery of the lens supporting wall 14. As shown in Fig. 2, the portion of the wall 28 adjacent the slot 27 has markings 29 to indicate the settings of the diaphragms 21 for different positions of the diaphragm adjusting lever 26.

As shown in Fig. 3, the front part 6 of the camera casing 5 has a shutter supporting wall 30 spaced inward from the wall 14 and between the walls 14 and 30 a disc shutter 31 is placed, this shutter 31 being fixed on a shaft 32 which extends through and is supported by the wall 30. The wall 30 has therein apertures 33 aligned with the lenses 18, 19 and 20 so that light may pass, when the shutter is actuated, from the lenses to the photographic plate 34 supported by a plate holder 35 insertable into a plate holder recess 36 formed in the rear wall 37 of the rear section 7 of the camera casing 5. By the term "photographic plate" I designate any member of glass, Celluloid or other material having a photographically sensitized surface or coating thereon, the term therefore being inclusive of photographic film. The rear wall 37 has ahead of the plate holder 36 a shallow filter plate recess 38 to receive a filter plate 39 carrying filters 40, 41, and 42 disposed as shown in the schematic view, Fig. 5.

As shown in Figs. 3, 4 and 5, the camera has a prismatic light divider 43 supported ahead of the lenses 18, 19 and 20, and contained within a hood 45 which is mounted on the front of the casing 5, this hood 45 having at the front end thereof an aperture 46 through which light may pass from the object to be photographed to the light divider 43. As shown in Fig. 5, light passes from the diagrammatically indicated object 47 along a single optical axis 48, to the front end of the light divider 43. This light divider divides the light received along the axis 48 from the object 47 into three bundles as indicated by the diverging arrows 49, and the light divider 43 directs these three bundles of light to the lenses 18, 19 and 20 along the optical axis 18', 19' and 20' of these lenses 18, 19 and 20 which lenses, when the shutter 31 is in open position, transmit the three separate bundles of light rearwardly along the optical axes thereof through the shutter apertures 75, 76 and 77, through the filters 40, 41, and 42, and focus such bundles of light on the image receiving areas 50, 51 and 52 of the photographic plate 34.

The filters 40, 41 and 42 may be disposed anywhere between the lenses 18, 19 and 20 and the photographic plate 34, but in the present invention such filters are carried by a filter plate insertable in the recess 38, thereby making it possible to quickly substitute one filter plate 39 for another as may be required. In the preferred practice of the invention the filters 40, 41 and 42 are characterized by their ability to accomplish sharp spectral color separation or cut off, and therefore the images received by the areas 50, 51 and 52 of the plate 34 receive only the color value images characteristic of the filters 40, 41 and 42, and when the plate 34 is developed, the images formed in the image receiving areas 50, 51 and 52 will constitute black and white color value transparencies representing the true values and distribution of color contained in the object 47. Reasons for the foregoing are that the image divider or light divider 43 accurately divides the total light received along the axis 48 into three separate bundles of light of equal strength which are transmitted rearwardly along the optical axes 18', 19' and 20', and these bundles of light are then passed through the light apertures of the diaphragms 21 which are correlated so that the apertures will be all of exactly the same size and therefore the light received by the lenses 18, 19 and 20 will be identical value or strength. Accordingly, identical images of the object 47 will be transmitted rearwardly from the three lenses 18, 19 and 20, so that if it were not for the interposition of the filters 40, 41 and 42, identical black and white negative images would be formed in the areas 50, 51 and 52, but the filters 40, 41 and 42 produce color separations in the bundles of light which are passed rearwardly from the lenses 18, 19 and 20 with the result that the areas 50, 51 and 52 are exposed only to the respectively filtered images, and upon development, the plate 34 becomes a single unit carrying three coordinated or complementary black and white color value transparencies representing the object 47.

As shown in Figs. 5 and 6, the light divider 43 has a rhomboidal prism 53 disposed with its front face 54 normal to the axis 48 and a triangular prism 55 cemented to the upper diagonal face 56 of the prism 53. The rear face 57 of the rhomboidal prism 53 crosses the optical axis 20' of the lower lens 20 and is perpendicular to this axis. To the rear face 57 of the prism 53 a rectangular prism 58 is cemented, the rear end 59 of this prism 58 confronting the lens 20. A triangular prism 60 is cemented to the rear face 61 of the triangular prism 55 and to the diagonal faces 62 and 63 of the triangular prism 60. Diverging prisms 64 and 65 are cemented, these prisms 64 and 65 having rear and end faces perpendicular to the axes 18' and 19' of the lenses 18 and 19, and confronting such lenses 18 and 19.

Referring to Fig. 3, the diagonal surface 56 of the prism 53 is partly silvered so that a portion of the light received along the axis 54 will be deflected downward as indicated by arrows 67. The lower face 68 of the prism 43 is highly polished to constitute a reflector so that light received along the axis represented by the arrow 67 will be reflected rearwardly along the axis 20' to the lens unit 17, as indicated by arrows 69.

The diagonal faces 62 and 63, Fig. 4, of the triangular prism 60 are partly silvered so that a portion of the light received thereby will be transmitted laterally, and the diagonal inner faces 70 of the prisms 64 and 65 form reflectors aligned respectively with the surfaces 62 and 63 so that the light which passes through the triangular prism 55, as indicated by arrows 71, will be reflected outwardly as indicated by arrows 72 of Fig. 4. The light which passes outwardly in opposite directions along the axes indicated by the arrows 72 strikes the polished or mirrored diagonal outer faces 73 of the prisms 64 and 65 and is reflected along the axes 18' and 19' to the lens units 15 and 16 as indicated by arrows 74. Accordingly, the image received from the object 47, Fig. 5, along the single axis 48 is divided by the light divider 43 into three separate bundles or portions of light which pass rearward from the light divider 43 along the optical axes 18′, 19′ and 20′.

As shown in Fig. 3, a diagonal mirror 79 is mounted on the upper part of the wall 14 in such position that it will reflect through a lens 78′ the light received along the axis 78 which is aligned with the axis 48 upwardly along the axis defined by the arrows 80. On the top of the front part 6 of the casing 5 a housing 81 is mounted and in this housing 81 a diagonal mirror 82 is supported in such position that the light received from the lens 78′, as indicated by the arrows 80, will be transmitted rearwardly along the axis indicated by the arrows 84 to a ground glass finder screen 85 which is mounted on the top of the rear part 7 of the casing 5 in a housing 86 which is connected to the rear part 7 and is disposed in telescoping relation to the housing 81. This finder screen 85 is of the same size as each image receiving area 50, 51 or 52, and as relative movement of the front and rear parts 6 and 7 is produced for the purpose of focusing the camera, the finder screen 85 will be moved with relation to the mirror 82 in such a manner that the finder screen 85 will always be the same distance from the lens 78′ as the image receiving areas 50, 51 and 52 of the photographic plate 34 are from the lenses 18, 19 and 20, and therefore, whenever an image of an object is focused on the finder screen 85, the lenses 18, 19 and 20 of the camera will be in focused relation to the photographic plate 34, and when the shutter is moved to open position by the shutter operating mechanism, which will be hereinafter described, focused images of the object will be received by the image receiving areas 50, 51, and 52 of the plate 34. With this finder, the photographer sees an image of the object which is exactly the same as any one of the images which will be carried back from the lenses 18, 19, and 20 along the axes 18′, 19′ and 20′.

In Figs. 7, 8 and 9 I have shown the shutter supporting wall 30 with the shutter operating mechanism mounted thereon. Since the shutter 31 lies ahead of the shutter operating mechanism, the position of such shutter 31 with relation to the shutter operating mechanism is indicated by phantom lines. The positions of the lenses 18, 19 and 20, which are not shown in these figures, coincide with the apertures 33 in the wall 30. In Figs. 7 and 8 the shutter 31 is shown in closed position, and in Fig. 9 the shutter 31 is indicated in open position, wherein the apertures 75, 76 and 77 thereof are in fully open position with relation to the lenses 18, 19 and 20 and the apertures 33. A feature of the invention is that the shutter is so constructed and operated that the light permitted to pass when the shutter is moved into open position is the same for each of the lenses, thereby contributing to the effect of transmitting images of identical intensity from the lenses along the axes 18′, 19′ and 20′. An additional feature is that the shutter is moved substantially instantaneously from closed position as indicated in Fig. 8 to fully open position as shown in Fig. 9, is caused to dwell in this open position for the required length of time, and is then quickly returned to closed position.

Adjacent the shaft 32 a post 87 projects from the shutter 31 toward the shutter supporting wall 30, as shown in Figs. 7 to 10 inclusive, this post 87 constituting a part of the shutter adapted to be engaged by a thrust link 88 of the shutter operating mechanism. The thrust link 88 has at its lower end a shoulder 89 adapted to engage the flattened portion 90 of the post 87 when the link is moved from the position in which it is shown in Fig. 7 to the position thereof in Fig. 8, such movement of the link 88 being part of the operation of setting the shutter actuating mechanism for use. The upper end of the link 88 extends into a slot 91 formed in a cylindric body 92 which is fixed on the forward end of a shaft 93. This shaft 93 projects through the wall 30 and is connected to one end of a strong coil spring 94 contained within a casing 95. The upper end of the link 88 is pivotally connected to the member 92 by a pin 96 which extends through openings in the parts 88 and 92.

The cylindric member 92 has therein adjacent the front face of the wall 30 spaced openings or recesses 97 and 98 between which a shoulder 99 exists. The recess 97 has at its rightward extremity a shoulder 100 adapted to be engaged by a spring pressed latch lever 101 when the cylindric member 92 is rotated in clockwise direction from the position in which it is shown in Fig. 7 to the position in which it is shown in Fig. 8, the actuating spring 94 being thereby wound. For releasing the latch 101 a rod 102 is provided, slidable in members 103 and extending to the exterior of the camera, where it is provided with a button 104 disposed externally of a retracting spring 105. When the button 104 is pressed inward, the inner end of the rod 102 will swing the lever 101 in clockwise direction, and release the cylindric body 92 so that it may be rotated at high velocity from the position in which it is shown in Fig. 8 to the position in which it is shown in Fig. 9. A manually engageable lever 106 is disposed on the top of the camera, for setting or rotating the member 92 against the force of the spring 94, this lever 106 being formed on a circular member 107 which is rotatable on a shaft or a pin 108 and has a gear segment 109 arranged to engage an idler gear 107′ which in turn engages a gear segment 110 formed on the front portion of the cylindric member 92. The shutter actuating mechanism has an adjustable dwell producing means having as a part thereof a yieldably supported detent member 111 which, in one of its positions of operation, is disposed in the path of movement of the shoulder 99 of the member 92. The detent 111 is mounted on a pin 112 which projects forwardly from the shutter supporting wall 30, and has a lever portion 113 projecting in a direction away from the detent 111 for cooperation with a fulcrum lever 114 swingable on a pin 115 which extends forwardly from the wall 30.

The lower end of the lever 114 has thereon a gear segment 116 adapted to engage the front gear 117 of a speed increasing gear train 118 which is adapted to drive a ratchet wheel 119 forming part of an escapement 120. In addition to the ratchet wheel 119, the escapement 120 includes a toothed rocker 121 carried by a pin 122 which is in turn supported by a plate or lever 123 swingable on a pin 124 which projects forwardly from the wall 30.

The toothed rocker 121 is moved into and out of engagement with the ratchet wheel 119 by swinging the plate 123 on the pin 124. For this purpose an escapement operating lever 125 is fulcrumed on a pin 126, the lower end of this lever 125 having therein a slot 127 which engages a pin 128 on the plate 123. The lever 125 is urged in a direction to carry the toothed rocker 121 into engagement with the ratchet wheel 119 by a spring 129. The lever 125 is curved as shown and has a rounded head 130 on its upper end adapted to be engaged by the upper rounded end 131 of the thrust link 88 when the shutter operating mechanism is set by swinging the lever 106 from the position in which it is shown in Fig. 7 into the position in which it is shown in Fig. 8, thereby rotating the cylindrical body 92 into the position in which it is shown in Fig. 8, wherein the latch lever 101 may engage the shoulder 100 of the cylindrical body 92, and whereby the link 88 will be lifted from the position in which it is shown in Fig. 7 to its raised position of Fig. 8, wherein, under the the leftward force of a spring 132, which is mounted on the wall 30, the shoulder 89 will be brought into a position above the flattened portion 90 of the post 87 and the portion of the thrust link 88 below the shoulder 89 will be held against such flattened portion 90.

The engagement of the uper end 131 of the thrust link 88 with the rounded head 130, when the shutter actuating link mechanism is set as described in the foregoing, and as shown in Fig. 8, rotates the lever 125 in counterclockwise direction on its supporting pin 126. The rightward movement of the lower end of the lever 125 at this time swings the plate 123 in counterclockwise direction, thereby carrying the toothed rocker 121 out of engagement with the ratchet wheel 119, so that the gear train 118 is relieved of the restraint of the rocker 121 and the gears thereof may rotate freely as the fulcrumed lever 114 is adjusted into its desired timing position. For adjusting the fulcrumed arm 114 through its different positions, an adjusting member 133 is provided, this adjusting member 133 consisting of a wheel, the outer portion 134 of which projects from the camera casing, and a cam 135 adapted to engage the fulcrumed lever 114 below the pivot 115 and thereby move the gear segment 116 rightwardly through selected distances from the position in which it is shown in Fig. 8.

Accordingly, when the shutter operating mechanism is set, as shown in Fig. 8, the escapement means 120 associated with the gear train 118 is released, so that the gears will rotate freely, and therefore the adjusting member 133 may be actuated to shift the lower end of the fulcrum lever 114 rightwardly to any desired extent, thereby changing the starting point of the gear segment and thereby varying the shutter dwell timing. An explanation of this operation is as follows. With the shutter operating mechanism set as shown in Fig. 8, the part 136 of the gear segment 116 engages the first gear 117 of the gear train 118, and the escapement 120 is in its released position. Now, when the latch lever 101 is released by pressing the button 104, the spring 94 rotates the cylindrical body 92 in counter-clockwise direction, carrying the thrust link 88 downward so that its upper end 131 is moved into a position as shown in Fig. 9, out of engagement with the head 130 on the upper end of the fulcrumed lever 125, so that this lever 125 swings the toothed rocker 121 into engagement with the ratchet wheel 119. Substantially simultaneously therewith, the shoulder 99 comes into engagement with the detent member 111, and the cylindrical member 92 also moves the thrust link substantially instantaneously down into a position near to that in which it is shown in Fig. 9, thereby carrying the shutter 31 substantially instantaneously into open position, in which it is maintained by the thrust link 88.

The shoulder 99 presses against the detent member 111, and tends to rotate the same in clockwise direction on its supporting pin 112, so that its lever 113 bears upwardly against the upper end of the fulcrum lever 114. The pressure thus transmitted to the lever 114 causes the gear segment 116 to act rightwardly upon the gear train 118 so that the component gears thereof start to rotate at a speed controlled by the escapement 120.

As the gear elements for the gear train rotate, the gear segment 116 moves rightward from the position in which it is shown, and the counterclockwise rotation of the fulcrum lever 114 permits a clockwise rotation of the detent 111 so that finally the detent 111 moves out of the path of the shoulder 99, as shown in Fig. 7, and permits the cylindrical body 92 to move toward the position in which it is shown in Fig. 7. During this time the shoulder 89 near the lower end of the thrust link 88 remains in engagement with the post 87 of the shutter 31, but as the upper end of the thrust link 88 moves rightwardly from the position in which it is shown in Fig. 9, the intermediate portion 137 thereof will engage a stationary stop pin 138 which projects forwardly from the wall 30, and as the upper end of the thrust link 88 continues its rightward movement, the reaction of the stop 138 against the intermediate part 137 of the thrust link 88 causes the lower portion of the thrust link 88 to swing leftward around the pin 96 so that the shoulder 89 is carried out of engagement with the post 87, thereby releasing the shutter 31 so that it may be returned from the open position in which it is shown in Fig. 9 to its closed position of Fig. 7, by the torque of the spring 139 which acts in counterclockwise direction on the shaft 32 to which the shutter 31 is fixed.

In the operation of the mechanism, the first rotary movement of the cylindrical member 92 from its position of Fig. 8 to its position of Fig. 9 carries the shutter 31 instantaneously into open position, then during the time the detent 111, by engagement with the shoulder 99 reduces the speed of rotation of the cylindrical body 92 to a low value, the shutter 31 is caused to dwell in open position, and the length of time the shutter 31 dwells in this open position is determined by the length of time it takes the detent 111 to recede from the detaining position in which it is shown in Fig. 9. The adjusting member 133 has also a cam 140' adjustable by the cameraman into a position wherein it will engage an extension 140 formed on the fulcrum link 125 below the pivot 126 so as to prevent the link 125 from swinging from its position of Fig. 8 to its position of Fig. 9, whereby the escapement 120 will be constantly held in released position; therefore the gear train 118 may rotate at higher velocity because of the absence of the restraining action of the escapement 120, and thereby reducing the dwell time to values below those produced when the escapement 120 is employed. For instantaneous opening and closing of the shutter 31, the fulcrum lever 114 is maintained by adjusting the cam 135 of the member 133 into such position that it will hold the gear segment 116 in a position so far to the right that it will not engage the first gear 117 of the gear train 118.

For manual operation of the shutter, a manually engageable lever 150 is provided, mounted on a screw 151 so that its handle portion projects from the casing of the camera. The inner end of the lever 150 is connected by gear teeth to a lever 154 swingable on a screw 153, the inner end 155 of which lever 154 engages a plate 156 slidably supported by pins 157 which are supported on the wall 30. The plate 156 carries a rectangular opening with a shoulder 158 normally positioned above the post 87 of the shutter 31 when the plate 156 is held in raised position by a spring 159. To accomplish manual operation of the shutter, the camera user presses the handle of the lever 150 downward from the position in which it is shown in Fig. 7, thereby moving the plate 156 downward so that the shoulder 158 will engage and move the post 87 downward from its position of Fig. 7 to its position of Fig. 9, independently of the action of a thrust link 88.

By use of the invention, very close control over the exposure of the image receiving areas 50, 51 and 52 is obtained, since each path of light 18', 19' and 20', Fig. 4, is controlled by an identical shutter function, identical light apertures. Also, of great importance is the fact that the register of the image areas is maintained for the reason that they all form part of a single unit photographic plate 34. In addition to this, image values are preserved for the reason that the image areas are all subjected to the same development time and conditions so as to be identically developed. If the photographic plate 34 consists of a film, shrinkage caused by the developing action will be the same throughout all of the image areas, and this shrinkage may be readily compensated for in a viewing or reproducing device such as shown in my copending application, Serial No. 652,720, for Method and Color Metering Apparatus for Composing Colored Pictures, filed March 7, 1946 and now abandoned. The single photographic unit having thereon the plurality of color value images is especially useful where the colored picture is to be transmitted by sound or wire photo, for the reason that all of the images are positioned so that they may be scanned in a single scanning operation, whereby size and register of the transmitted images will be substantially maintained, enabling the production of proportionate facsimiles at distant points from which colored pictures may be readily and economically composed as taught in my copending application above identified.

I claim as my invention:

In a camera, the combination of: a plurality of lenses arranged around a center; means for receiving the images from said lenses; a shutter means rotatable around said center, said shutter means having walls to cover said lenses when the shutter means is in closed position, and spaces adjacent said walls to coincide with said lenses when said shutter means is in opened position; and shutter operating means for moving said shutter means between opened and closed positions, comprising a spring urging said shutter means toward closed position, shutter opening means having a spring element stronger than said spring and an engager engaging said shutter means whereby the force of said spring element may be transmitted to said shutter means to move the same into opened position against the force of said spring, and timing means for releasing said engager from said shutter means, thereby enabling said spring to return said shutter means to said closed position thereof.

RICHARD THOMAS.

REFERENCES CITED

The following references are of record in the file of this patent:

UNITED STATES PATENTS

| Number | Name | Date |
|---|---|---|
| 524,802 | Foiret | Aug. 21, 1894 |
| 852,476 | Verbeck | May 7, 1907 |
| 1,187,884 | Brigden | June 20, 1916 |
| 1,304,466 | Evans | May 20, 1919 |
| 1,485,956 | Bredon | Mar. 4, 1924 |
| 1,836,340 | Ross | Dec. 15, 1931 |
| 1,845,062 | Shustek et al. | Feb. 16, 1932 |
| 1,931,983 | Fitz | Oct. 24, 1933 |
| 2,053,224 | Reason | Sept. 1, 1936 |
| 2,060,505 | Killman et al. | Nov. 10, 1936 |
| 2,152,224 | Thomas | Mar. 28, 1939 |
| 2,214,228 | Eppensteiner | Sept. 10, 1940 |
| 2,281,607 | Thomas | May 5, 1942 |
| 2,283,077 | Maurer, Jr. | May 12, 1942 |
| 2,317,612 | Huebner | Apr. 27, 1943 |
| 2,361,661 | Sparling | Oct. 31, 1944 |

FOREIGN PATENTS

| Number | Country | Date |
|---|---|---|
| 93,028 | Austria | June 11, 1923 |
| 195,630 | Great Britain | Dec. 20, 1923 |
| 319,195 | Great Britain | Sept. 17, 1929 |

Certificate of Correction

Patent No. 2,530,793                                                    November 21, 1950

RICHARD THOMAS

It is hereby certified that error appears in the printed specification of the above numbered patent requiring correction as follows:

Column 2, line 53, for the words "is provided" read *is to provide*; column 4, line 70, after the numeral "17" insert *and*; column 9, line 21, for "uper" read *upper*; column 10, line 53, for "cam 140'" read *cam 140*; line 55, for "extension 140" read *extension 140'*; column 11, line 15, for "of a" read *of the*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*